(12) United States Patent
Rupavatharam

(10) Patent No.: US 8,493,959 B2
(45) Date of Patent: *Jul. 23, 2013

(54) MULTIPLE MEDIA ACCESS CONTROL (MAC) ADDRESSES

(75) Inventor: Sreekanth Rupavatharam, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 327 days.

This patent is subject to a terminal disclaimer.

(21) Appl. No.: 12/855,506

(22) Filed: Aug. 12, 2010

(65) Prior Publication Data

US 2010/0306571 A1    Dec. 2, 2010

Related U.S. Application Data

(63) Continuation of application No. 11/353,015, filed on Feb. 14, 2006, now Pat. No. 7,801,150.

(51) Int. Cl.
*G06F 15/16* (2006.01)
*H04J 3/24* (2006.01)

(52) U.S. Cl.
USPC ........... 370/349; 370/379; 370/218; 370/219; 370/220; 370/221; 370/254; 370/389; 370/395.31; 709/208; 709/209

(58) Field of Classification Search
USPC ......... 370/312, 349, 379, 218–221, 254–257, 370/389, 390, 392, 395.31, 395.32, 395.54, 370/432, 469, 471; 709/208, 209, 245; 710/110
See application file for complete search history.

(56) References Cited

U.S. PATENT DOCUMENTS

| | | | |
|---|---|---|---|
| 4,264,954 A | 4/1981 | Briggs et al. | |
| 5,473,599 A | 12/1995 | Li et al. | |
| 5,511,190 A | 4/1996 | Sharma et al. | |
| 5,774,640 A | 6/1998 | Kurio | |
| 5,970,069 A | 10/1999 | Kumar et al. | |
| 6,138,209 A | 10/2000 | Krolak et al. | |
| 6,195,705 B1 | 2/2001 | Leung et al. | |
| 6,317,434 B1 | 11/2001 | Deng | |
| 6,397,260 B1 | 5/2002 | Wils et al. | |
| 6,421,730 B1 | 7/2002 | Narad et al. | |
| 6,424,650 B1 * | 7/2002 | Yang et al. | 370/390 |
| 6,487,605 B1 | 11/2002 | Leung | |
| 6,516,371 B1 | 2/2003 | Lai et al. | |
| 6,556,547 B1 | 4/2003 | Srikanth et al. | |
| 6,580,712 B1 | 6/2003 | Jennings et al. | |
| 6,590,861 B1 | 7/2003 | Vepa et al. | |

(Continued)

OTHER PUBLICATIONS

Co-pending U.S. Appl. No. 11/353,015, filed Feb. 14, 2006 entitled "Multiple Media Access Control (MAC) Addresses" by Sreekanth Rupavatharam, 34 pages.

(Continued)

*Primary Examiner* — Michael Thier
*Assistant Examiner* — Benjamin H Elliott, IV
(74) *Attorney, Agent, or Firm* — Harrity & Harrity, LLP

(57) ABSTRACT

A method for providing multiple media access control (MAC) addresses in a device of a master/slave system may include providing a first MAC address in a MAC address storage of the device. The method may also include providing a second MAC address in a multicast table entry of a multicast hash filter of the device.

20 Claims, 8 Drawing Sheets

U.S. PATENT DOCUMENTS

| | | |
|---|---|---|
| 6,594,227 B1 | 7/2003 | Ogawa et al. |
| 6,633,538 B1 * | 10/2003 | Tanaka et al. .................. 370/222 |
| 6,684,307 B2 | 1/2004 | Kikuchi et al. |
| 6,751,191 B1 | 6/2004 | Kanekar et al. |
| 6,779,125 B1 | 8/2004 | Haban |
| 6,856,591 B1 | 2/2005 | Ma et al. |
| 6,928,478 B1 | 8/2005 | Gangadharan |
| 6,977,939 B2 | 12/2005 | Joy et al. |
| 7,240,041 B2 | 7/2007 | Martin et al. |
| 7,260,648 B2 | 8/2007 | Tingley et al. |
| 7,283,465 B2 | 10/2007 | Zelig et al. |
| 7,283,525 B2 | 10/2007 | Burgess et al. |
| 7,318,076 B2 | 1/2008 | Chen et al. |
| 7,421,578 B1 | 9/2008 | Huang et al. |
| 7,447,149 B1 | 11/2008 | Beesley et al. |
| 7,469,281 B2 | 12/2008 | Kaneda et al. |
| 7,486,611 B1 | 2/2009 | Wilson |
| 7,515,589 B2 | 4/2009 | Bacher et al. |
| 7,580,417 B2 | 8/2009 | Ervin et al. |
| 7,593,346 B2 | 9/2009 | McLaggan et al. |
| 7,801,150 B1 * | 9/2010 | Rupavatharam ......... 370/395.32 |
| 2002/0196761 A1 * | 12/2002 | Kaneko .......................... 370/338 |
| 2003/0012169 A1 | 1/2003 | Takatori et al. |
| 2003/0126195 A1 | 7/2003 | Reynolds et al. |
| 2003/0198224 A1 | 10/2003 | Lee et al. |
| 2004/0001492 A1 | 1/2004 | Johnson |
| 2004/0141468 A1 | 7/2004 | Christensen et al. |
| 2004/0215752 A1 * | 10/2004 | Satapati et al. ................ 709/223 |
| 2005/0025179 A1 | 2/2005 | McLaggan et al. |
| 2005/0053060 A1 | 3/2005 | Pettey |
| 2005/0111446 A1 | 5/2005 | Greaves et al. |
| 2005/0132030 A1 | 6/2005 | Hopen et al. |
| 2005/0254489 A1 | 11/2005 | Jain et al. |
| 2006/0041734 A1 | 2/2006 | Lim et al. |
| 2006/0106963 A1 | 5/2006 | Sasaki et al. |
| 2006/0107108 A1 | 5/2006 | Geng et al. |
| 2006/0161704 A1 * | 7/2006 | Nystad et al. .................. 710/105 |
| 2006/0233168 A1 | 10/2006 | Lewites et al. |
| 2007/0036161 A1 | 2/2007 | Mahamuni |
| 2007/0183419 A1 | 8/2007 | Kompella |
| 2007/0206492 A1 | 9/2007 | Zelig et al. |
| 2007/0288653 A1 | 12/2007 | Sargor et al. |
| 2008/0008169 A1 | 1/2008 | Karino et al. |
| 2009/0049199 A1 | 2/2009 | Kuik et al. |
| 2010/0306571 A1 * | 12/2010 | Rupavatharam ................... 714/3 |

OTHER PUBLICATIONS

Ex Parte Gutta; Appeal 2008-3000. U.S. Appl. No. 10/014,202. Technology Center 3600. Decided: Jan. 15, 2009 (from Internet May 7, 2010); http://des.uspto.gov/Foia/ReterivePdf?system=BPAI&fINm=fd20083000-01-14-2009-1.

* cited by examiner

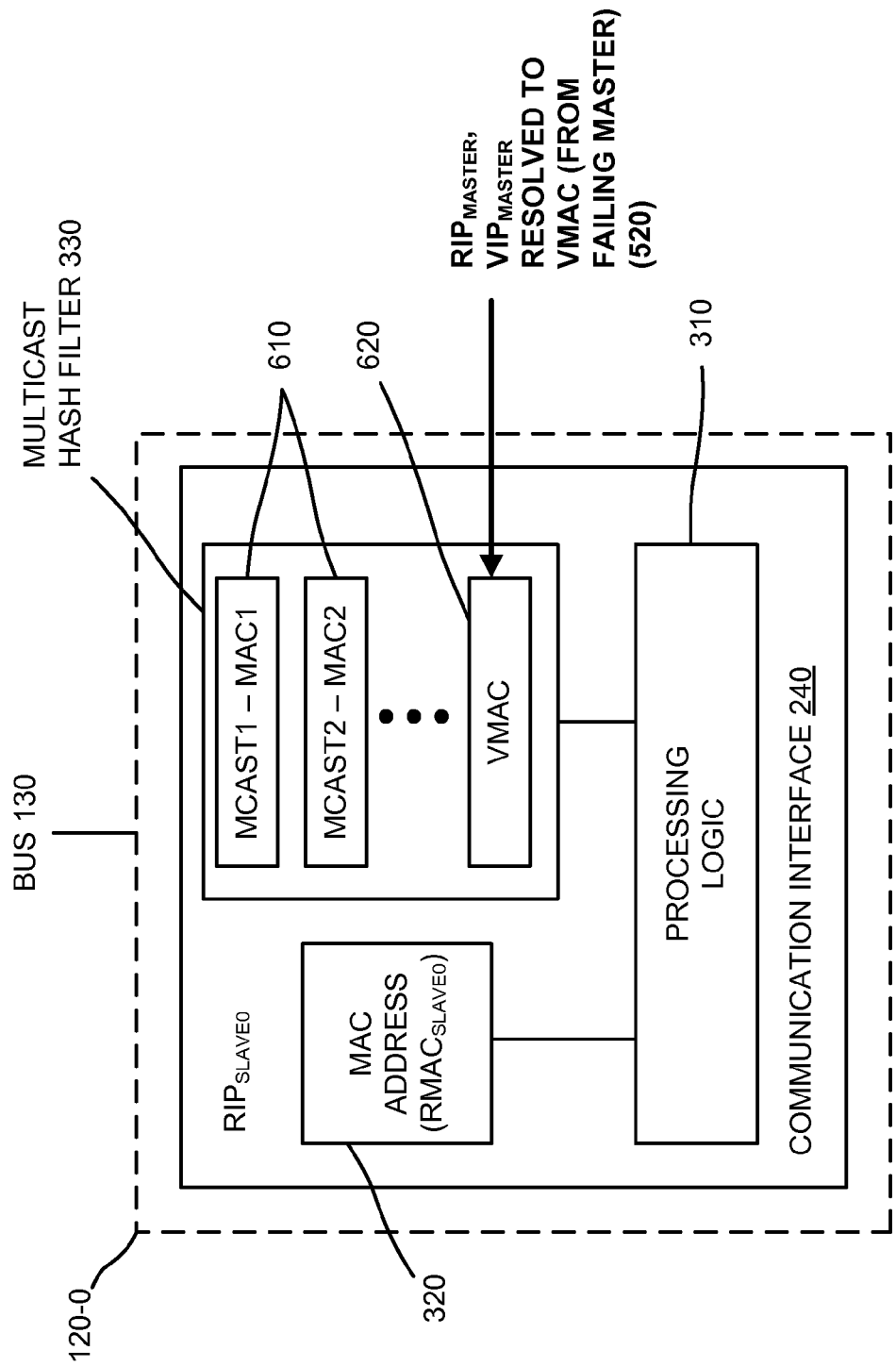

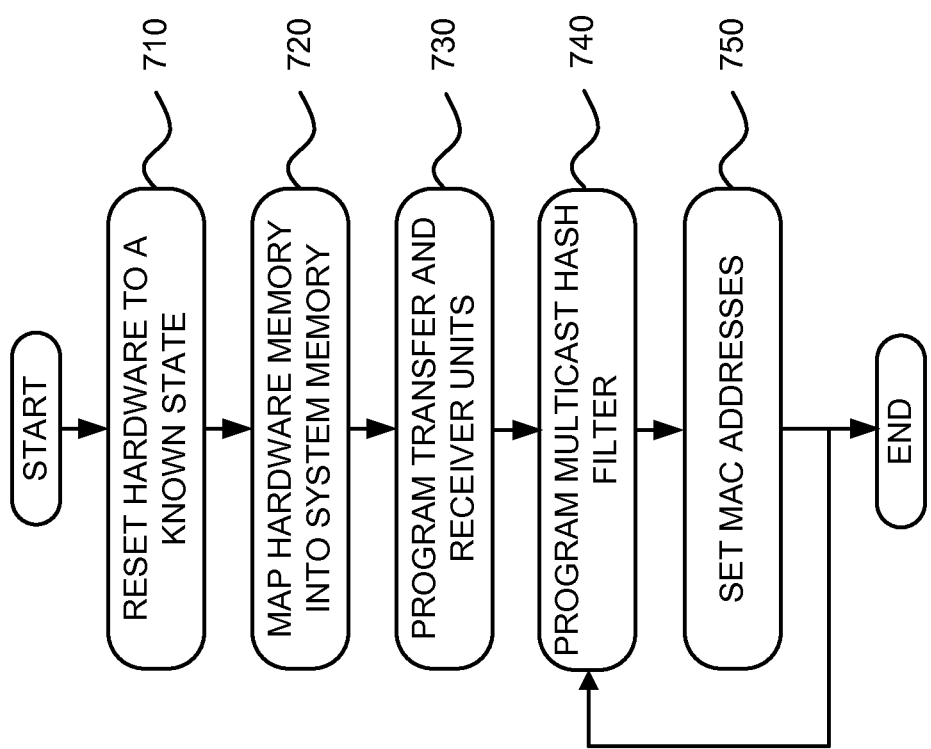

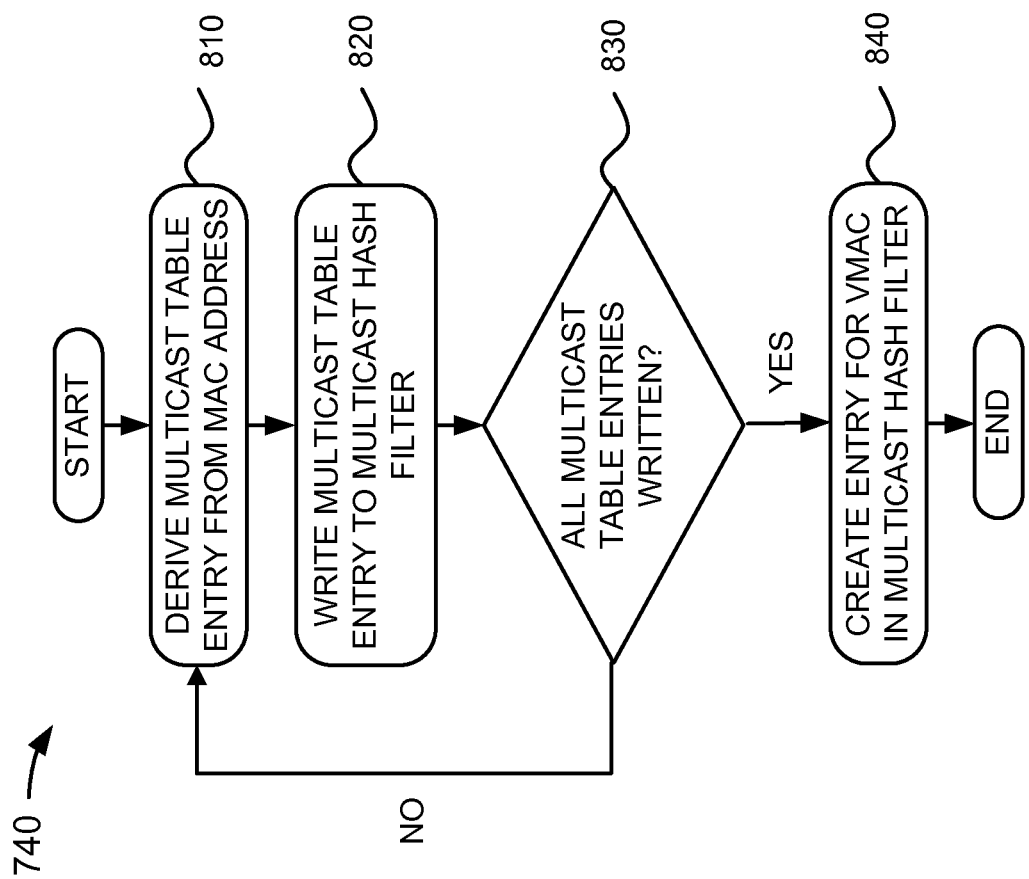

MULTIPLE MEDIA ACCESS CONTROL (MAC) ADDRESSES

RELATED APPLICATION

This application is a continuation of U.S. patent application Ser. No. 11/353,015, filed Feb. 14, 2006, which is incorporated herein by reference.

BACKGROUND

1. Field of the Invention

Implementations consistent with the principles of the invention relate generally to data processing and, more particularly, to preventing disruptions in a redundant master/slave system with multiple Media Access Control (MAC) addresses.

2. Description of Related Art

Master-slave systems have been in existence for years. In such systems, a master device usually controls the operation of one or more slave devices. For example, the master device might cause the slave devices to perform certain operations or functions required by the system. In some systems, the master device connects to the slave devices via one or more dedicated wires. A problem with such systems is that the number of connecting wires can become unmanageable.

In other systems, the master device connects to the slave devices via a bus. Bus systems, like these, have proven to be more efficient than their counterpart dedicated wiring systems. A concern in master-slave bus systems is what to do when the master device fails. Oftentimes, such failures can take down the entire system until the master device can be replaced or restarted, which may not occur for an extended period of time.

To minimize system reliance on the operation of a single master device, redundant master devices can be used. In this case, one master device typically acts as the system master and the other slave devices act as backups in case of failure to the system master. The master device usually communicates with the slave devices over a bus.

The master device and each slave device typically include a communication interface (also known as a network card, network interface card, and/or NIC). Such communication interfaces are useful in Ethernet-based master/slave systems. Since all communications in Ethernet-based systems are broadcast over a common medium (e.g., a bus), any information sent by one device connected to the system is received by all of the devices connected to the system, even if that information was intended for just one destination. A communication interface may filter out information not addressed to it, interrupting the master/slave device only when applicable packets of information are received.

Each communication interface is typically assigned a unique real MAC (RMAC) address to ensure that all devices in an Ethernet network have distinct addresses. A real MAC address is a hardware or physical address that uniquely identifies each device of a system. A real MAC address may be programmed by the device manufacturer. In Virtual Router Redundancy Protocol (VRRP) systems, a VRRP or virtual MAC (VMAC) address may be used to send information to a proper location. A virtual MAC address may be associated with and/or used by whichever device is the system master in a master/slave system.

Each communication interface may also be assigned an Internet Protocol (IP) address. An IP address is an identifier for a device on a network, e.g., a TCP/IP network. Networks using the TCP/IP protocol may route information based on the IP address of the destination. An IP address may be virtual or real. A virtual IP (VIP) address is an IP address that may be shared among multiple devices. A virtual IP address may be associated with and/or used by whichever device is the system master in a master/slave system. A real IP (RIP) address may be used by the network device upon which a process is executing. The format of a real IP address may be a 32-bit numeric address written as four numbers separated by periods. Each number may be zero to 255. For example, 1.160.10.240 could be a real IP address.

In redundant master/slave systems, when the master device fails and a slave device assumes the role of a master, the virtual MAC (VMAC) address associated with the original master device may replace the real MAC (RMAC) address of the slave device (i.e., the new system master). When a system later requests a response from the system master, the system master (e.g., the slave device assuming the role of the system master) may respond to the request with the virtual MAC (VMAC) address. The slave device (i.e., the new system master) does not respond with its own real MAC (RMAC) address. This arrangement allows the system to always use the same MAC address regardless of whichever device is the current system master.

Unfortunately, replacement of the real MAC (RMAC) address in the slave device removes the association between the real MAC (RMAC) address and the real IP (RIP) address, and causes the virtual MAC (VMAC) address to be associated with the real IP (RIP) address. Administrative services (e.g., system status checks, interface checks, connectivity checks, configurations, executing diagnostics, etc.) are run through the real IP (RIP) address. Thus, access to administrative services are lost to the slave device (the new system master) when the real MAC (RMAC) address is replaced with the virtual MAC (VMAC) address, and/or at least until other system devices can update their Address Resolution Protocol (ARP) tables (a lookup table used to translate IP addresses to MAC addresses), which may not occur for an extended period of time.

SUMMARY

According to one aspect, a method for providing multiple media access control (MAC) addresses in a device of a master/slave system may include providing a first MAC address in a MAC address storage of the device. The method may also include providing a second MAC address in a multicast table entry of a multicast hash filter of the device.

According to another aspect, a method for preventing disruption of a system that includes a slave device connected to a master device via a bus may include determining whether the master device is operable. The method may also include providing a first media access control (MAC) address to the slave device when the master device is inoperable, the slave device having a second MAC address provided therein. The method may further include causing the slave device to operate based on the first and second MAC addresses as a system master when the master device is inoperable.

According to yet another aspect, a slave device connected to a master device via a bus and being capable of storing multiple media access control (MAC) addresses may include a communication interface. The communication interface may include a MAC address storage capable of storing a first MAC address. The communication interface may also include a multicast hash filter having a plurality of multicast table entries and being capable of storing a second MAC address as one of the multicast table entries.

According to a further aspect, a method for using a multicast hash filter of a network device may include writing at least one multicast table entry to the multicast hash filter. The method may also include borrowing an entry from the multicast hash filter for a media access control (MAC) address.

According to still another aspect, a communication interface capable of storing multiple media access control (MAC) addresses may include a MAC address storage capable of storing a first MAC address. The communication interface may also include a multicast hash filter having a plurality of multicast table entries and being capable of storing a second MAC address in one of the multicast table entries. The communication interface may further include processing logic communicating with the MAC address storage and the multicast hash filter to control or configure the MAC address storage and the multicast hash filter.

According to still a further aspect, a device of a redundant master/slave system may include a multicast hash filter having a plurality of multicast table entries and storing a virtual media access control (MAC) address in one of the multicast table entries.

According to another aspect, a system my include a bus, a master device, and a slave device connected to the master device via the bus. The slave device may include a communication interface that includes a media access control (MAC) address storage capable of storing a real MAC address. The communication interface may further have a multicast hash filter having a plurality of multicast table entries and being capable of storing a virtual MAC address as one of the multicast table entries.

According to yet another aspect, a system for preventing disruption of a master/slave configuration may include means for determining whether a master device of the master/slave configuration is operable, and means for storing a real media access control (MAC) address in a slave device of the master/slave configuration. The system may also include means for providing a virtual MAC address to the slave device when the master device is inoperable, and means for storing the virtual MAC address in the slave device without replacing the real MAC address.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 6 is an exemplary diagram of a slave device of FIG. 1 according to an implementation consistent with the principles of the invention; and FIGS. 7 and 8 are flowcharts of exemplary processing for a master device and/or a slave device of FIG. 1 according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Systems and methods consistent with principles of the invention may provide multiple MAC addresses for devices in a redundant master/slave system. This may allow any system device to store a virtual MAC address (permitting any device in the system to assume the role of the system master) and a real MAC address (permitting access to administrative services through a real IP address).

Exemplary System Overview

Figure 1:
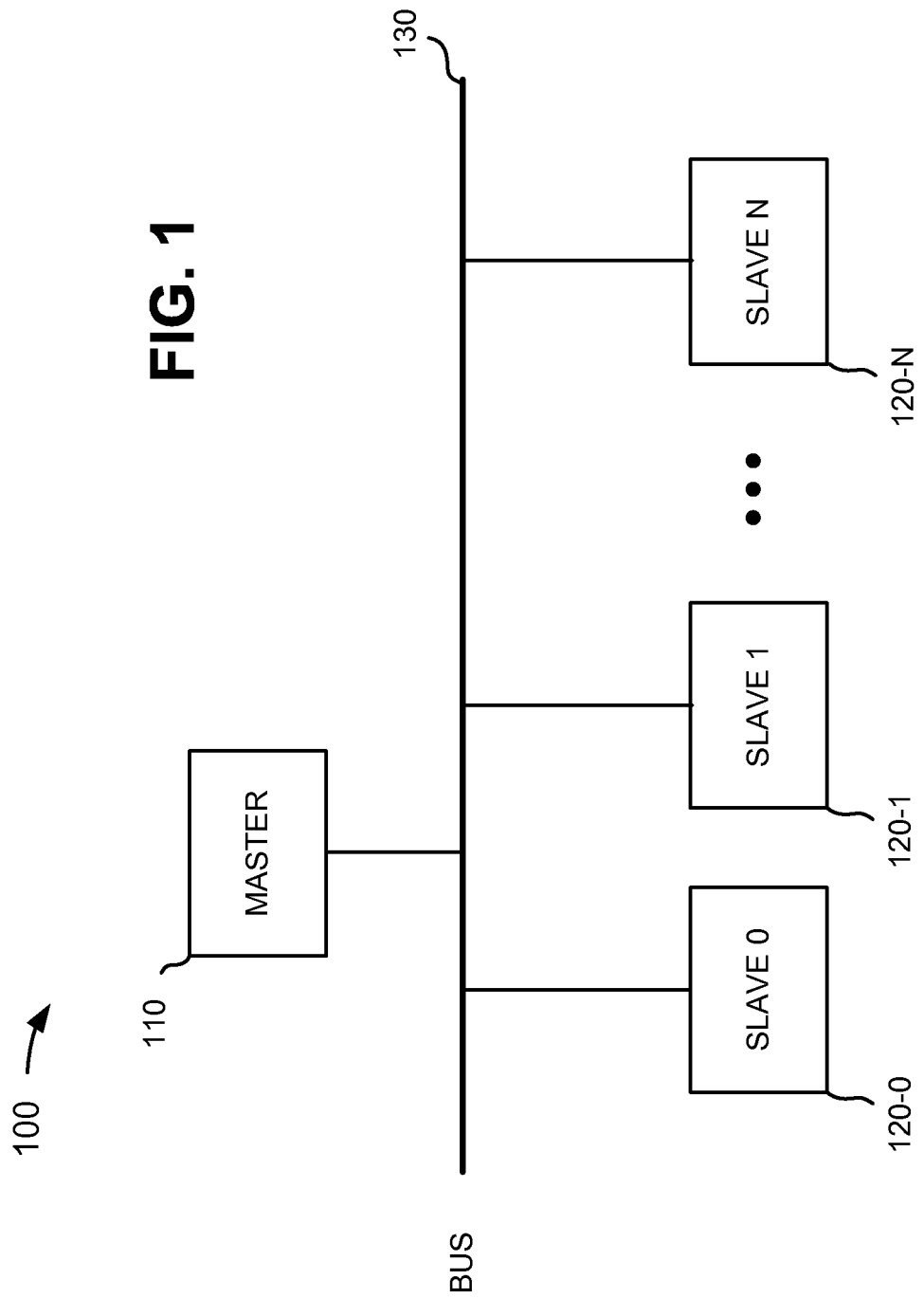
FIG. 1 is a block diagram illustrating an exemplary system in which systems and methods consistent with the principles of the invention may be implemented.

FIG. 1 is a block diagram illustrating an exemplary system 100 in which systems and methods consistent with the principles of the invention may be implemented. In one implementation consistent with the principles of the invention, system 100 may be configured as part of a network device, such as a router or a switch. System 100 may also be configured as a network (e.g., a local area network (LAN)), a private network (e.g., a company intranet), or another type of network.

As shown in FIG. 1, system 100 may include a master device 110 and slave devices 120-0, 120-1, . . . , 120-N (collectively referred to as slave devices 120) connected to a bus 130. While one master device 110 and one bus 130 are shown in FIG. 1, more master devices 110 and buses 130 may be used in other implementations consistent with the principles of the invention. System 100 may also include other components, devices, etc. (not shown in FIG. 1).

During operation, master device 110 may transmit commands and other signals on bus 130. For example, master device 110 may control slave devices 120 and/or the processes running on slave devices 120. In an implementation where system 100 is located within a network device, master device 110 may also connect to respective routing engines. Master device 110 may provide commands to slave devices 120 via bus 130, and may provide commands to itself. The commands may include, without limitation, reset, clock selection, power up, and power down commands.

Slave devices 120 may include system interfaces, processing devices, or other types of devices, and may be configured in a manner similar to master device 110. Slave devices 120 may receive commands from master device 110 and respond to these commands to master device 110, via bus 130. In one implementation, a slave device 120 may be configured to act as a backup and/or assume the role of master device 110 in the event master device 110 fails. For example, if master device 110, slave device 120-0, and slave device 120-1 fail, then one of slave devices 120-2, . . . , 120-N may assume the role of the system master.

Master device 110 and/or slave devices 120 may make decisions regarding system mastership. For example, it may be decided that master device 110 is ready to be the system master (i.e., master device 110 is booted, its software is running, it is connected to system 100, and it is capable of operating system 100). It may alternatively be decided that master device 110 is not ready to be the system master, and that one of slave devices 120 is ready to assume the role of the system master (i.e., slave device 120 is booted, its software is running, it is connected to system 100, and it is capable of operating system 100).

Master device 110 and/or slave devices 120 may implement processes for determining system mastership. For example, if master device 110 is ready to be the system master, then master device 110 may become the system master. If a slave device 120 is the system master due to failure by master device 110, and master device 110 is now ready to become the system master again, then slave device 120 may be programmed to back down and permit master device 110 to resume the role of the system master.

In another implementation consistent with the principles of the invention, slave device 120 may continue to be the system master until it becomes inoperable. If slave device 120 fails, any of the other slave devices and/or master device 110 may become the system master and remain the system master until that device fails.

Exemplary Master/Slave Device Configuration

Figure 2:
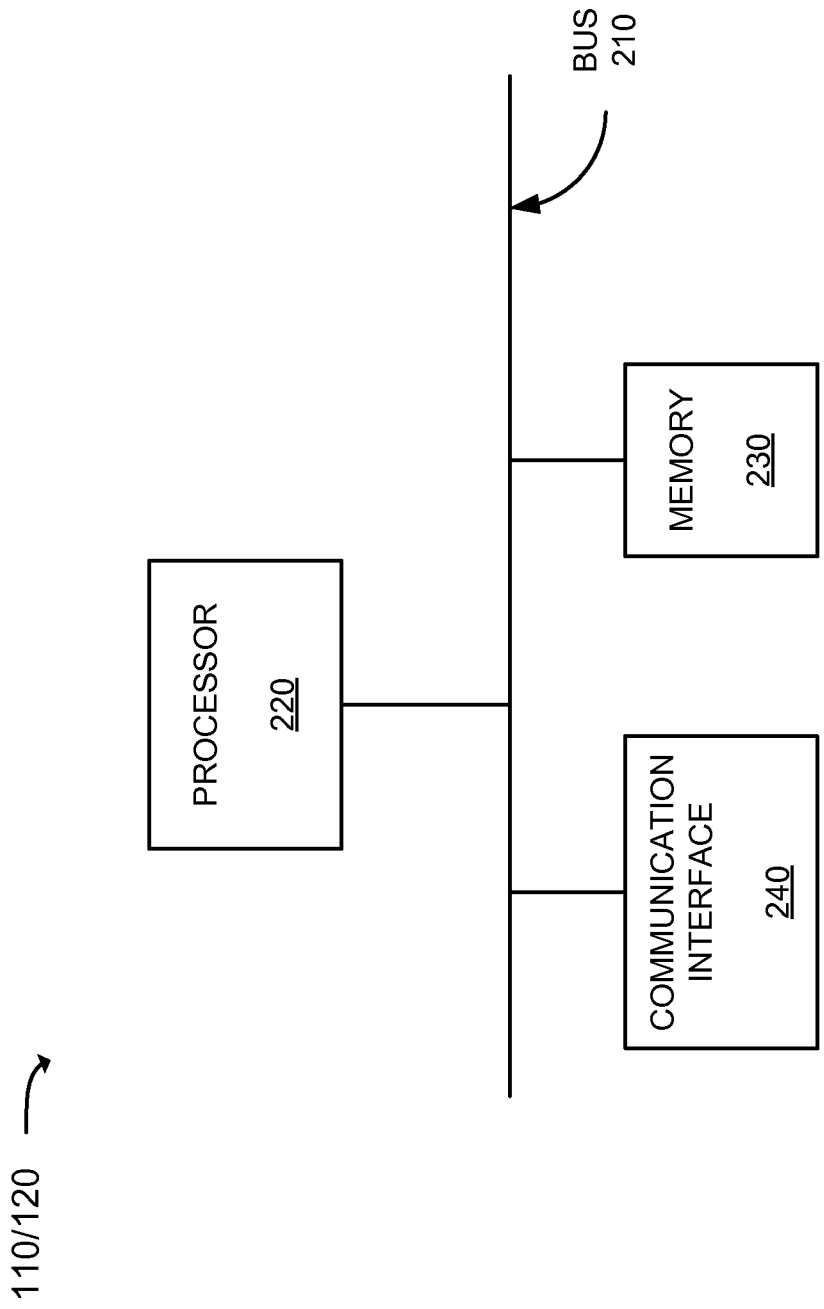
FIG. 2 is an exemplary diagram of a device that may correspond to a master device and/or a slave device of FIG. 1 according to an implementation consistent with the principles of the invention.

FIG. 2 is an exemplary diagram of a device that may correspond to one of master/slave devices 110/120 of FIG. 1. The device may include a bus 210, a processor 220, a memory 230, and a communication interface 240.

Bus 210 may include a path that permits communication among the elements of the device. Processor 220 may include a processor, microprocessor, or processing logic that may interpret and execute instructions. Memory 230 may include a random access memory (RAM), a read only memory (ROM) device, a magnetic and/or optical recording medium and its corresponding drive, and/or another type of static and/or dynamic storage device that may store information and instructions for execution by processor 220. Communication interface 240 may include any transceiver-like mechanism that enables the device to communicate with other devices and/or systems. For example, communication interface 240 may include a network card, such as a network interface card (NIC) and/or an Ethernet device, such as an Ethernet NIC.

The device, consistent with the principles of the invention, may perform certain operations, as described in detail below. The device may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as a data storage device, or from another device via communication interface 240. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Communication Interface Configuration

Figure 3:
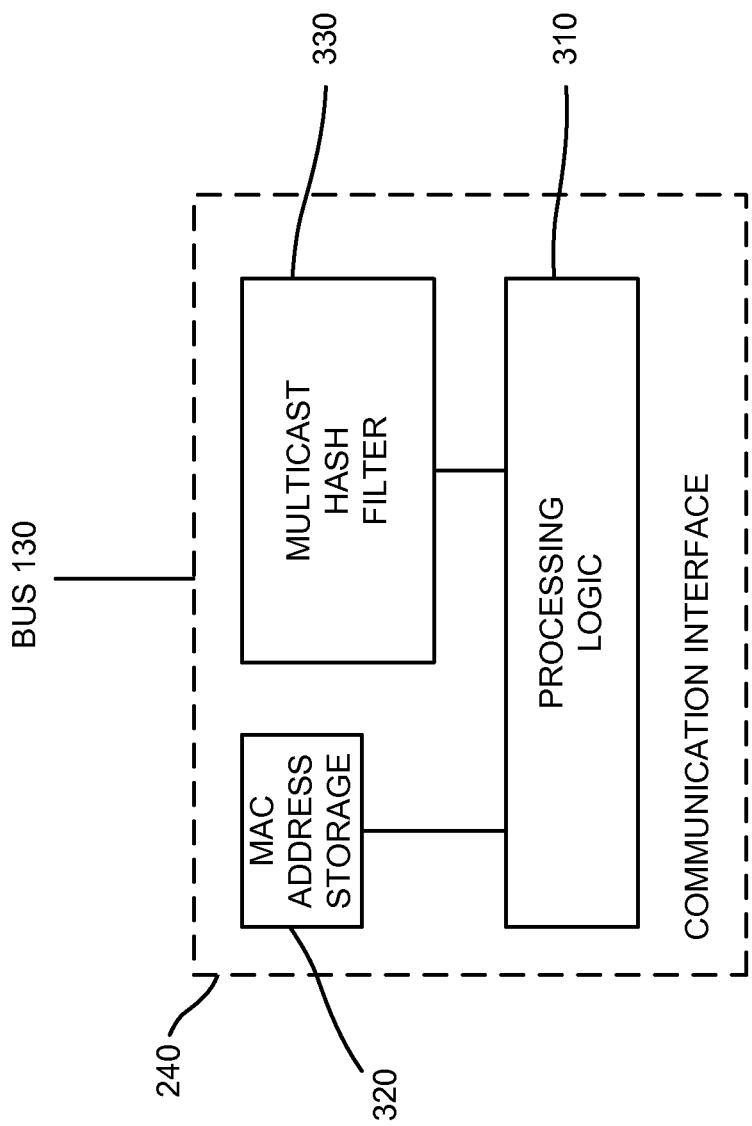
FIG. 3 is an exemplary diagram of a communication interface of FIG. 2 according to an implementation consistent with the principles of the invention.

FIG. 3 is an exemplary diagram of communication interface 240 of master/slave devices 110/120 according to an implementation consistent with the principles of the invention. Communication interface 240 may include processing logic 310, a MAC address storage 320, and a multicast hash filter 330.

Processing logic 310 may include logic that processes data received from system 100 and/or data for transmission to system 100, via, e.g., bus 130. For example, processing logic 310 may be part of processor 210 of FIG. 2 and/or may include protocol control firmware, logic that controls and/or configures communication interface 240 and/or its components, logic that controls status monitoring of communication interface 240, etc. Processing logic 310 may communicate with MAC address storage 320 and multicast hash filter 330 to control and/or configure these components, process data received by and/or transmitted from these components, etc.

MAC address storage 320 may provide a location to store a real MAC (RMAC) address. The real MAC address may be a unique value associated with communication interface 240. A MAC address is also known as a hardware address or a physical address. The real MAC address may uniquely identify communication interface 240 (and the master/slave device of which it is a component) in system 100. For example, real MAC address may include a twelve digit hexadecimal number (forty-eight bits in length) written in the following format MM:MM:MM:SS:SS:SS or MM-MM-MM-SS-SS-SS. The first half of a MAC address may contain the identification number of the device manufacturer, and the second half of a MAC address may represent the serial number assigned to the device by the manufacturer.

Multicast hash filter 330 may distinguish datagrams desired by communication interface 240 (and, e.g., master/slave device 110/120), from datagrams that are not desired. A "datagram(s)" may include any type or form of data, such as packet and non-packet data. For example, in an Ethernet-based system, multicast hash filter 330 may filter out the desirable information from the broadcast information that is sent to all devices in such a system. Multicast hash filter 330 may include multiple entries (e.g., up to sixty-four entries) in a list, where each entry may include one multicast address and a corresponding MAC address. When a datagram is sent through system 100, the multicast address of the datagram may be determined, and multicast hash filter 330 may be used to find the MAC address corresponding to the multicast address. If the MAC address of the datagram matches the MAC address in multicast hash filter 330, then the datagram may be accepted by, e.g., communication interface 240. Likewise, if the MAC addresses of the datagram and multicast hash filter 330 do not match, then the datagram may be dropped by, e.g., communication interface 240.

Although only processing logic 310, MAC address storage 320, and multicast hash filter 330 are shown in FIG. 3, communication interface 240 may contain more or less components capable of providing functionality to communication interface 240. For example, communication interface 240 may include other electronic circuitry that permits communication with the devices of system 100.

Exemplary System Operation

Figure 4:
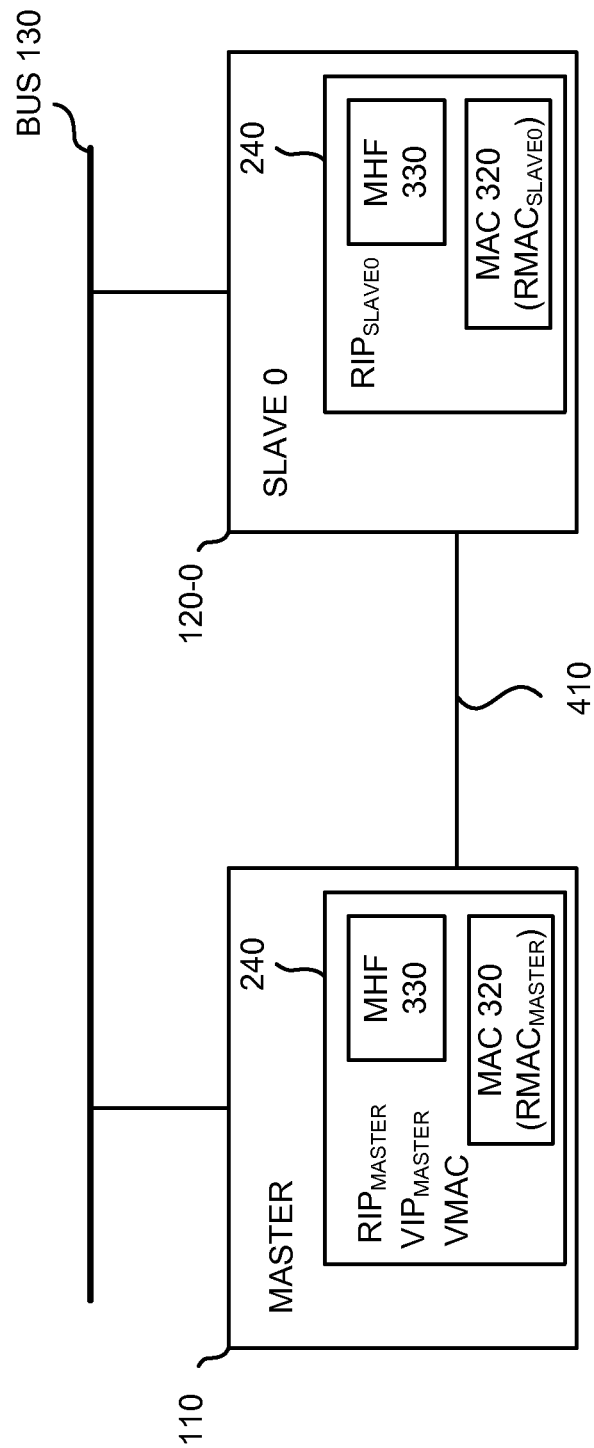
FIGS. 4 and 5 are exemplary diagrams of a portion of the system of FIG. 1 according to an implementation consistent with the principles of the invention.
Figure 5:
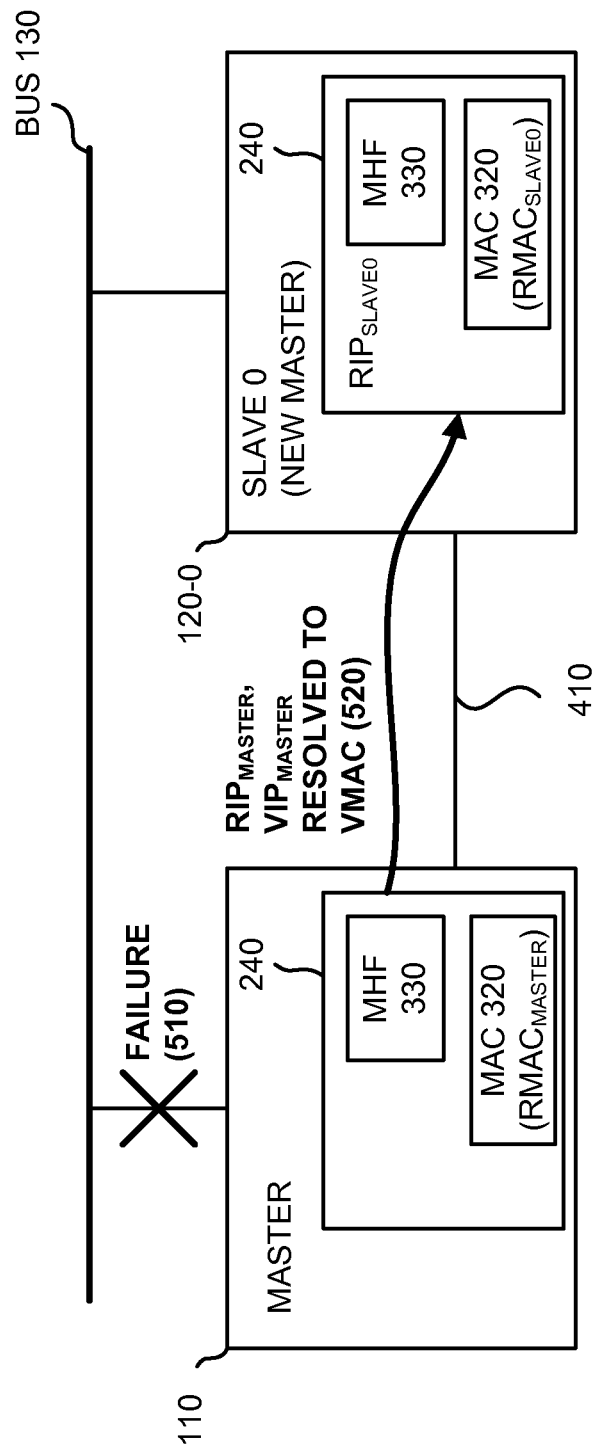

FIGS. 4-6 are exemplary diagrams of the operation of portions of system 100 according to an implementation consistent with the principles of the invention.

Master Device Operational and Assumes the Role of the System Master

As shown in FIG. 4, master device 110 and slave device 120-0 may connect to bus 130, and each device may contain communication interface 240. Each communication interface 240 may include MAC address storage (MAC) 320 and multicast hash filter (MHF) 330. Processing logic 330 of each communication interface 240 has been omitted for clarity purposes, but may also be included in each communication interface 240.

As further shown in FIG. 4, master device 110 may be operable (i.e., master device 110 is booted, its software is running, it is connected to system 100, and it is capable of operating system 100) and may assume the role of the system master. As the system master, master device 110 may include a real IP ($RIP_{MASTER}$) address and a virtual IP ($VIP_{MASTER}$) address. Real IP ($RIP_{MASTER}$) address may be used by the device upon which a process is executing. Virtual IP ($VIP_{MASTER}$) address typically may be associated with the system master.

Master device 110 may further include a real MAC ($RMAC_{MASTER}$) address that may be stored in MAC address storage 320 and may uniquely identify master device 110 in system 100. Master device 110 may also include a virtual MAC (VMAC) address if master device 110 is the system master. However, the virtual MAC (VMAC) address may move to another device (e.g., a slave device) if that device becomes the system master. That is, whichever device is the system master may assume ownership of the virtual MAC (VMAC) address. In master/slave systems, however, typically only one device may be the system master at any one time.

Slave device 120-0 may also be operable, but may not assume the role of the system master as long as master device 110 is operable. In another implementation of the invention, any device (e.g. master device 110, slave device 120-0, . . . , 120-N) may assume the role of the system master and retain that role until it is inoperable. Slave device 120-0 may include a real IP ($RIP_{SLAVE0}$) address, and a real MAC ($RMAC_{SLAVE0}$) address that may be stored in MAC address storage 320 and may uniquely identify slave device 120-0 in system 100.

As shown in FIG. 4, master device 110 and slave device 120-0 may have a common private link 410 that enables exchange of information about the status (e.g., the operability) of each of the devices. Master device 110 may have a similar common private link 410 with the other slave devices, e.g., slave devices 120-1, . . . , 120-N. Slave devices 120-0, . . . , 120-N may also have a similar common private link 410 among themselves. Common private link 410 enables each device in system 100 to know the status of every other device in system 100 so that disruptions may be avoided. Although common private link 410 is shown as separate from bus 130, bus 130 may also be used as the common link between the devices of system 100. However, if bus 130 is used, the privacy aspect of the common private link may be lost.

Master Device Fails and Slave Device Assumes the Role of the System Master

FIG. 5 shows an arrangement of master device 110 and slave device 120-0 similar to the arrangement shown in FIG. 4. However, in the arrangement of FIG. 5, master device 110 may be inoperable (i.e., master device 110 is not booted, its software is not running, it has lost connectivity with system 100, and/or it is not capable of operating system 100), as shown by a failure 510. In such a situation, processing may be disrupted until master device 110 is made operable because system 100 may be searching for real MAC ($RMAC_{MASTER}$) address of master device 110 and may not be able to locate it.

According to an implementation consistent with the principles of the invention, in the event of master device 110 failure, virtual IP ($VIP_{MASTER}$) address and real IP ($RIP_{MASTER}$) address of master device 110 may be resolved (e.g., through use of ARP tables) to virtual MAC (VMAC) address, as shown by reference numeral 520. Virtual MAC (VMAC) address may be sent to an operable slave device, e.g., slave device 120-0, and may be used by slave device 120-0 (the new system master) to send and/or receive information within system 100 (e.g., process traffic of system 100). Whichever device may be the system master may assume ownership of virtual MAC (VMAC) address.

Such an arrangement may prevent disruption of information flow within system 100 by moving system control to operable devices, e.g., slave device 120-0. When system 100 sends a request for one of the virtual IP addresses, the system master (e.g., slave device 120-0) may respond to the request with its virtual MAC (VMAC) address. This may allow system 100 to use the same MAC address regardless of which device may be the current system master.

However, storage of virtual MAC (VMAC) address may be problematic. One solution may be to replace real MAC ($RMAC_{SLAVE0}$) address of slave device 120-0 with virtual MAC (VMAC) address. Unfortunately, replacement of real MAC ($RMAC_{SLAVE0}$) address of slave device 120-0 may remove the association between real MAC ($RMAC_{SLAVE0}$) address and real IP ($RIP_{SLAVE0}$) address, and cause virtual MAC (VMAC) address to be associated with real IP ($RIP_{SLAVE0}$) address of slave device 120-0. Administrative services (e.g., system status checks, interface checks, connectivity checks, configurations, executing diagnostics, etc.) may run through real IP ($RIP_{SLAVE0}$) address of slave device 120-0. Thus, access to administrative services may be lost to slave device 120-0 if real MAC ($RMAC_{SLAVE0}$) address is replaced with virtual MAC (VMAC) address, and/or at least until other system devices can update their ARP tables.

According to an implementation consistent with the principles of the invention and as shown in FIG. 6, storage of virtual MAC (VMAC) address may occur in slave device 120-0 without losing real MAC ($RMAC_{SLAVE0}$) address of slave device 120-0. As shown in FIG. 6, MAC address storage 320 may store real MAC ($RMAC_{SLAVE0}$) address.

Multicast hash filter 330 may include several multicast table entries (e.g., up to sixty-four multicast table entries) in a list, where each entry may include one multicast address and a corresponding MAC address. For example, multicast table entries 610 may include multicast addresses (MCAST1 and MCAST2) and corresponding MAC addresses (MAC1 and MAC2, respectively). Typically fewer than the available sixty-four multicast table entries of multicast hash filter 330 are utilized for multicast/MAC addresses. Virtual MAC (VMAC) address may be stored on slave device 120-0 by borrowing a multicast table entry 620 from multicast hash filter 330 and storing virtual MAC (VMAC) address in multicast table entry 620. This may permit slave device 120-0 to store multiple MAC addresses, e.g., both real MAC ($RMAC_{SLAVE0}$) address and virtual MAC (VMAC) address.

In an another implementation consistent with the principles of the invention, virtual MAC (VMAC) address may be stored in MAC address storage 320, and real MAC ($RMAC_{SLAVE0}$) address may be stored in multicast table entry 620 of multicast hash filter 330. This arrangement also may permit slave device 120-0 to store multiple MAC addresses, e.g., both real MAC ($RMAC_{SLAVE0}$) address and virtual MAC (VMAC) address. Processing to accomplish this arrangement may be performed by switching virtual MAC (VMAC) address with real MAC ($RMAC_{SLAVE0}$) address.

In still another implementation, both virtual MAC (VMAC) address and real MAC ($RMACs_{SLAVE0}$) address may be stored in multicast table entries 620 of multicast hash filter 330. This arrangement may permit slave device 120-0 to store multiple MAC addresses, e.g., both real MAC ($RMAC_{SLAVE0}$) address and virtual MAC (VMAC) address. Processing to accomplish this arrangement may be performed by using two multicast table entries 620 of multicast hash filter 330, one entry for storing virtual MAC (VMAC) address and one entry for storing real MAC ($RMAC_{SLAVE0}$) address.

In one implementation consistent with the principles of the invention, virtual MAC (VMAC) address and/or real MAC ($RMAC_{SLAVE0}$) address may be stored in another underutilized component of communication interface 240. For example, communication interface 240 may include a memory and/or a register that is underutilized, and virtual MAC (VMAC) address and/or real MAC ($RMAC_{SLAVE0}$) address may be stored in the unutilized portion of these underutilized components. Processing to accomplish this arrangement may be performed by creating at least one entry in a portion of the underutilized component for storing virtual MAC (VMAC) address and/or real MAC ($RMAC_{SLAVE0}$) address.

The provision of multiple MAC addresses on a device of system 100 may prevent system disruption because virtual MAC (VMAC) address may be used to process (e.g., route and/or control) information within system 100. Real MAC ($RMAC_{SLAVE0}$) address may prevent loss of access to administrative services, via real IP ($RIP_{SLAVE0}$) address, because real MAC ($RMAC_{SLAVE0}$) address may be associated with real IP ($RIP_{SLAVE0}$) address.

Although multicast hash filter 330 of only slave device 120-0 is shown in FIG. 6, space may be borrowed from any multicast hash filter 330 of any device, e.g., slave device 120-0, ..., 120-N and/or master device 110 to accommodate virtual MAC (VMAC) address.

The operation of system 100 according to another implementation consistent with the principles of the invention may be similar if slave device 120-0 (the system master) failed and master device 110 was still inoperable. If this were to occur, another slave device, e.g., slave device 120-1, ..., 120-N, may assume the role of the system master similar to the way slave device 120-0 assumed the role of the system master.

Exemplary Processing

FIGS. 7 and 8 are flowcharts of exemplary processing by a master device 110 and/or slave device 120 of FIG. 1 according to an implementation consistent with the principles of the invention. The processing of slave device 120-0 will be described with respect to the features of FIGS. 5 and 6. Similar processing may be performed by master device 110 and slave devices 120-1, ..., 120-N.

Processing may begin with the powering up (e.g., boot up) of slave device 120-0. During power up, slave device 120-0 may reset the hardware of slave device 120-0 (e.g., communication interface 240) to bring the hardware to a known state (block 710). Further during power up, slave device 120-0 may map the hardware memory of slave device 120-0 into system memory (block 720). For example, slave device 120-0 may create a link into the hardware memory of slave device 120-0. Still further during power up, slave device 120-0 may program the datagram transfer and receiver units of slave device 120-0 (block 730).

After power up, slave device 120-0 may program multicast hash filter 330 (block 740) of slave device 120-0, and may set the MAC addresses (block 750) of slave device 120-0. Slave device 120-0 may repeat these two acts as necessary. For example, multicast hash filter 330 may create a multicast table entry and may set the MAC address of the multicast table entry.

FIG. 8 provides exemplary acts involved in the act of programming multicast hash filter 330 (block 740). Slave device 120-0 may begin by deriving a multicast table entry from a MAC address (block 810). For example, slave device 120-0 may create multicast table entry 610 of FIG. 6, which may include a multicast address (MCAST1) and a corresponding MAC address (MAC1). Slave device 120-0 may write the multicast table entry to the table of multicast hash filter 330 (block 820).

If all the multicast table entries have not been written to multicast hash filter 330 (block 830—NO), then slave device 120-0 may derive and write other multicast table entries as necessary and/or until all the multicast table entries have been written to multicast hash filter 330 (e.g., may repeat blocks 810 and 820). If all the multicast table entries have been written to multicast hash filter 330 (block 830—YES), then slave device 120-0 may create an entry for virtual MAC (VMAC) address in multicast hash filter 330 (block 840). This enables both virtual MAC (VMAC) address and real MAC ($RMAC_{SLAVE0}$) address of slave device 120-0 to be stored on slave device 120-0.

In one implementation consistent with the principles of the invention, the writing of multicast table entries and the creating a virtual MAC (VMAC) entry in multicast hash filter 330 may occur a number of distinct times. For example, the writing of multicast table entries and the creating a virtual MAC (VMAC) entry may occur any time system 100 refreshes and/or the system master changes.

The exemplary acts shown in FIG. 8 may occur at any time. For example, the exemplary acts (blocks 810-830) shown in FIG. 8 may occur prior to slave device 120-0 becoming the system master, and/or after slave device 120-0 becomes the system master. The act of creating (i.e., borrowing) a table entry for virtual MAC (VMAC) address (block 840) may occur when slave device 120-0 becomes the system master.

CONCLUSION

Systems and methods consistent with principles of the invention may prevent system disruption in a redundant master/slave system. Provision of multiple MAC addresses (e.g., virtual and real MAC addresses) in system devices may permit any system device to assume the role of a master, preventing system disruption while maintaining access to administrative services.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although described in the possible context of a redundant master/slave system, concepts consistent with the principles of the invention may be implemented in any redundant system, device, or chip that communicates with another system, device, or chip via one or more buses.

Further, certain portions of the invention have been described as "logic" that performs one or more functions. This logic may include hardware, such as an application specific integrated circuit, software, or a combination of hardware and software.

Also, while series of acts have been described with regard to the flowcharts of FIGS. 7 and 8, the order of the acts may differ in other implementations consistent with the principles of the invention. Further, non-dependent acts may be performed in parallel.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
 a slave device communicatively connected to a master device in the system,
  the slave device including:
   a first storage device that stores a real media access control (MAC) address of the slave device,
    the real MAC address of the slave device mapping to a real Internet protocol (IP) address associated with the slave device, and
   a second storage device that stores a virtual MAC address that is different from the real MAC address of the slave device,
    the second storage device being different from the first storage device, and
    the virtual MAC address mapping to a real IP address associated with the master device and a virtual IP address associated with the master device, and
   when a failure is associated with the master device, the slave device is to:
    receive the virtual MAC address from the master device,
    store the virtual MAC address in the second storage device,
    receive and process information, intended for the master device, based on the virtual MAC address, and
    receive administrative services based on the real MAC address of the slave device.

2. The system of claim 1, where the second storage device includes a programmable multicast hash filter that stores the virtual MAC address.

3. The system of claim 1, where the second storage device is contained in a communication interface of the slave device.

4. The system of claim 1, where the master device includes a programmable multicast hash filter that stores the virtual MAC address.

5. The system of claim 1, where, when storing the virtual MAC address, the slave device is to:
 store the virtual MAC address in the second storage device when the slave device assumes a role of the master device.

6. The system of claim 1, where the system further comprises:
 a different slave device to:
  use a real MAC address, of the different slave device, and the virtual MAC address when the slave device fails to assume a role of the master device.

7. The system of claim 1, where the administrative services include one or more of checking interfaces of the slave device, configuring the slave device, or executing diagnostics for the slave device.

8. The system of claim 1, where, when receiving the administrative services, the slave device is to:
 receive the administrative services based on the real MAC address of the slave device during a time interval when the slave device assumes a role of the master device after the failure.

9. A method comprising:
 storing, in a first storage device of a slave device, a real media access control (MAC) address of the slave device,
  the real MAC address of the slave device mapping to a real Internet protocol (IP) address associated with the slave device;
 receiving, by the slave device, a virtual MAC Address from a master device,
  the virtual MAC address mapping to a real IP address associated with the master device and a virtual IP address associated with the master device;
 storing, in a second storage device of the slave device, the virtual MAC address,
  the second storage device being different from the first storage device;
 using, by the slave device, the real MAC address of the slave device to access administrative services when a failure is associated with the master device; and
 using, by the slave device, the virtual MAC address to process traffic, intended for the master device, when the failure is associated with the master device.

10. The method of claim 9,
 where the second storage device includes a programmable multicast hash filter, and
 where storing the virtual MAC address occurs after the slave device begins to act as the master device.

11. The method of claim 9, further comprising:
 using, by a different slave device, the virtual MAC address to process other traffic, intended for the master device, when the slave device fails to operate as the master device.

12. The method of claim 9, where using the real MAC address of the slave device to access the administrative services includes:
 determining the real IP address associated with the slave device based on the real MAC address of the slave device, and
 accessing the administrative services using the real IP address associated with the slave device.

13. The method of claim 9, further comprising:
 storing the virtual MAC address in a multicast hash filter of the master device; and
 transmitting the virtual MAC address from the master device to the slave device.

14. The method of claim 13, where transmitting the virtual MAC address comprises:
 determining that the master device is inoperable, and
 transmitting the virtual MAC address from the master device to the slave device after determining that the master device is inoperable.

15. A non-transitory computer-readable medium storing instructions, the instructions comprising:
 one or more instructions that, when executed by at least one processor of a slave device, cause the at least one processor to:
  store a real media access control (MAC) address of the slave device in a first storage component of the slave device,
   the real MAC address of the slave device mapping to a real Internet protocol (IP) address associated with the slave device;
  receive a virtual media access control (MAC) address from a master device,
   the virtual MAC address mapping to a real IP address associated with the master device and a virtual IP address associated with the master device;
  store the virtual MAC address in a second storage component of the slave device,
   the second storage component being different from the first storage component;
  use the real MAC address of the slave device to access administrative services; and
  use the virtual MAC address to process data, intended for the master device, after a failure of the master device.

16. The non-transitory computer-readable medium of claim 15, where the second storage component includes a programmable multicast hash filter.

17. The non-transitory computer-readable medium of claim 16, where the one or more instructions to store the virtual MAC address include:
one or more instructions that, when executed by the at least one processor, cause the at least one processor to:
store the virtual MAC address in the programmable multicast hash filter after the slave device assumes a role of the master device.

18. The non-transitory computer-readable medium of claim 15, where the master device includes a programmable multicast hash filter that stores the virtual MAC address.

19. The non-transitory computer-readable medium of claim 15, where the one or more instructions to use the real MAC address of the slave device to access the administrative services include:
one or more instructions that, when executed by the at least one processor, cause the at least one processor to:
determine the real IP address associated with the slave device based on the real MAC address of the slave device, and
access the administrative services based on the real IP address associated with the slave device.

20. The non-transitory computer-readable medium of claim 15, where the administrative services include one or more of checking interfaces of the slave device, configuring the slave device, or executing diagnostics for the slave device.

* * * * *